(12) United States Patent
Huang et al.

(10) Patent No.: US 9,153,819 B2
(45) Date of Patent: Oct. 6, 2015

(54) NEGATIVE ELECTRODE FOR A LITHIUM ION BATTERY

(75) Inventors: Xiaosong Huang, Novi, MI (US); Yan Wu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 738 days.

(21) Appl. No.: 13/036,000

(22) Filed: Feb. 27, 2011

(65) Prior Publication Data

US 2012/0219852 A1    Aug. 30, 2012

(51) Int. Cl.
| | |
|---|---|
| *H01M 4/62* | (2006.01) |
| *H01M 4/13* | (2010.01) |
| *H01M 4/38* | (2006.01) |
| *H01M 4/583* | (2010.01) |
| *H01M 10/0525* | (2010.01) |

(52) U.S. Cl.
CPC .............. *H01M 4/622* (2013.01); *H01M 4/13* (2013.01); *H01M 4/386* (2013.01); *H01M 4/387* (2013.01); *H01M 4/583* (2013.01); *H01M 4/625* (2013.01); *H01M 4/626* (2013.01); *H01M 10/0525* (2013.01); *Y02E 60/122* (2013.01); *Y02T 10/7011* (2013.01); *Y10T 29/49108* (2015.01); *Y10T 29/49115* (2015.01)

(58) Field of Classification Search
USPC ................ 429/217, 232, 218.1, 231.8, 231.1; 204/291; 252/182.1
See application file for complete search history.

(56) References Cited

U.S. PATENT DOCUMENTS

| | | | |
|---|---|---|---|
| 6,451,480 B1 | 9/2002 | Gustafson et al. | |
| 6,455,194 B1 | 9/2002 | Maletki et al. | |
| 6,833,009 B2 | 12/2004 | Gonzalez et al. | |
| 2007/0111094 A1* | 5/2007 | Thackeray et al. | ........ 429/218.1 |
| 2007/0281216 A1 | 12/2007 | Petrat et al. | |
| 2008/0311480 A1* | 12/2008 | Sano | .............. 429/322 |
| 2009/0226361 A1* | 9/2009 | Campos-Delgado et al. | ........... 423/447.2 |
| 2009/0305131 A1* | 12/2009 | Kumar et al. | .................. 429/206 |
| 2010/0035153 A1* | 2/2010 | Thackeray et al. | ............ 429/219 |
| 2010/0136431 A1* | 6/2010 | Lee et al. | .................... 429/231.8 |
| 2010/0173198 A1 | 7/2010 | Zhamu et al. | |
| 2011/0033746 A1* | 2/2011 | Liu et al. | ........................ 429/209 |
| 2013/0052488 A1* | 2/2013 | Inagaki et al. | .................... 429/7 |

FOREIGN PATENT DOCUMENTS

| | | | | |
|---|---|---|---|---|
| JP | 2000-67939 | * | 3/2000 | ............. H01M 14/00 |
| WO | WO 01/29916 | * | 4/2001 | .............. H01M 4/04 |

OTHER PUBLICATIONS

Cao, D.; Wang B.; Wang G.; "Protein-modified lithium iron phosphate anode material", Jul. 8, 2009 (Abstract of CN 101478046).*

Liu, Hua Kun, et al., "Nanomaterials for Lithium-ion Rechargeable Batteries", Jrnl. of Nanoscience and Nanotechnology, vol. 6, (2006), pp. 1-1

Guerfi, A., et al., "LiFePO4 water-soluble binder electrode for Li-ion batteries", Journal of Power Sources 163, (2007), pp. 1047-1052.

Yoo, Mikyong, et al., "Interaction of Poly(vinylidene fluoride) with Graphite Particles. 1. Surface Morphology of a Comp[osite Film and Its Relation to Processing Parameters", Chem. Mater, (2003), 15, pp. 850-861.

* cited by examiner

*Primary Examiner* — Raymond Alejandro

(74) *Attorney, Agent, or Firm* — Dierker & Associates, P.C.

(57) ABSTRACT

A negative electrode for a lithium ion battery includes an active electrode material, a conductive additive, and a binder for holding the active electrode material and the conductive additive together. The binder is chosen from polyethyleneimine, copolymers of polyethyleneimine, amine functionalized polyamides, proteins, and combinations thereof.

12 Claims, 2 Drawing Sheets

US 9,153,819 B2

NEGATIVE ELECTRODE FOR A LITHIUM ION BATTERY

TECHNICAL FIELD

The present disclosure relates generally to lithium ion batteries, and more particularly to a negative electrode for a lithium ion battery.

BACKGROUND

Lithium ion batteries are rechargeable batteries where lithium ions move from a positive electrode to a negative electrode during charging of the battery, and move in the opposite direction when discharging the battery. The lithium ion battery also includes an electrolyte that carries the lithium ions between the positive electrode and the negative electrode when the battery passes an electric current therethrough.

SUMMARY

A negative electrode for a lithium ion battery includes an active electrode material, a conductive additive, and a binder for holding the active electrode material and the conductive additive together. The binder is chosen from polyethyleneimine, copolymers of polyethyleneimine, amine functionalized polyamides, and/or proteins.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium ion batteries may be incorporated in hybrid electric and battery powered vehicles to generate enough power to operate one or more systems of the vehicle. For instance, the battery may be used in combination with an internal combustion engine to propel the vehicle (such as in hybrid electric vehicles), or may be used alone to propel the vehicle (such as in battery powered vehicles). Lithium ion batteries may also be used in various consumer electronic devices (e.g., laptop computers, cameras, and cellular/smart phones), military electronics (e.g., radios, mine detectors, and thermal weapons), aircrafts, satellites, and/or the like.

Figure 1:
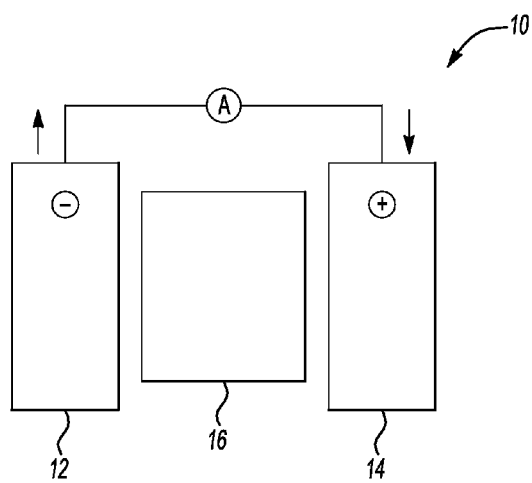
FIG. 1 schematically depicts an example of a lithium ion battery.

An example of a lithium ion battery 10 is schematically depicted in FIG. 1. The lithium ion battery 10 is a rechargeable electrolytic cell including a negative electrode 12, a positive electrode 14, and an electrolyte 16 operatively disposed between the negative electrode 12 and the positive electrode 14. The negative electrode 12 includes a current collector (not shown) upon which a negative electrode material is applied, and the positive electrode 14 includes a current collector (also not shown) upon which a positive electrode material is applied. The arrows indicate that current is flowing out of the negative electrode 12 and that current is flowing into the positive electrode 14. Thus, the lithium ion battery 10 depicted in FIG. 1 is shown in a charging state. It is to be understood that the lithium ion battery 10 also has a discharging state (not shown) where current flows in the opposite direction, i.e., from the positive electrode 14 into the negative electrode 12.

The lithium ion battery 10 may be used, for example, in a vehicle such as a hybrid electric vehicle (HEV), a battery electric vehicle (BEV), a plug-in HEV, or an extended-range electric vehicle (EREV). The battery 10 may be used alone, for example, in a battery system disposed in the vehicle, or may be one of a plurality of batteries of a battery module or pack disposed in the vehicle. In the later instance, the plurality of batteries may be connected in series or in parallel via electrical leads. In some cases, the negative electrode 12, positive electrode 14, and electrolyte 16 may be disposed inside a container. An example of a suitable container may be formed from a stiff or flexible polymer material, and may include a laminate, which includes an inner laminated metal foil.

The negative electrode material of the negative electrode 12 is a composite material including an active electrode material, a conductive additive, and a binder. The active electrode material is chosen from active carbon-based materials, active silicon-based materials, intermetallic alloys, oxides, or combinations of these materials. Examples of the active electrode materials include graphite, hard carbons (i.e., carbons that cannot be graphitized at a temperature falling within the range of about 2000° C. to about 3000° C.), soft carbons (i.e., carbons that can be graphitized at a temperature falling within the range of about 2000° C. to about 3000° C.), FeSn, $FeSn_2$, $Cu_6Sn_5$, Sn—Sb, silicon-carbon composites, $SnO_2$, $Li_4Ti_5O_{12}$, and combinations thereof. In an example, the active electrode material is present in an amount ranging from about 80 wt % to about 98 wt % of the negative electrode 12 excluding the current collector. In another example, the active electrode material is present in an amount ranging from about 80 wt % to about 90 wt % of the negative electrode 12 excluding the current collector.

The conductive additive for the negative electrode 12 material may be chosen from carbon blacks (such as, e.g., acetylene black, furnace black, Ketjen black, channel black, lamp black, and thermal black) and/or nickel powders. In an example, the conductive additive is present in an amount ranging from about 1 wt % to about 10 wt % of the electrode 12 excluding the current collector. In another example, the conductive additive is present in an amount ranging from about 3 wt % to about 7 wt % of the electrode 12 (i.e., the negative electrode 12 excluding the current collector).

The binder is used in the negative electrode 12 to physically hold the active material and the conductive additive together. The binder is chosen from a water-soluble polymer or polymer blend that includes one or more amine functional groups, one or more imine functional groups, or combinations thereof. At the outset, the polymers chosen for the binder enable intimate contact between the active electrode material and the conductive additive. This occurs, at least in part, because of the relatively small amount of binder that is used in the negative electrode material, and thus the particles of the active material and the conductive additive will more readily come into contact with each other. In view of the intimate contact between the active material and the conductive additive, the functional groups attached to the polymer can chemically react with, and attach to, the active electrode material of the negative electrode material via a covalent bond or a strong non-covalent bond (such as, e.g., a physical bond). As such, the binder of the instant disclosure provides increased binder strength, in part because of the stronger interaction (due, at least in part, to the intimate contact) between the active material and the conductive additive.

Furthermore, the functional groups of the binder are also adhesively attracted to the current collector, i.e., a metallic foil upon which a slurry of the negative electrode material (which includes the active material, the conductive additive and the binder holding the two components together) is applied to form the negative electrode 12. Without being bound to any theory, it is believed that when the slurry is applied to the current collector, functional groups of the binder adhere to the current collector. The binding strength of the functional groups is believed to enhance the contact between the negative electrode material and the current collector, which leads to more effective conduction and potentially a longer battery life. These functional groups also advantageously react with and consume acid byproducts (e.g., hydrofluoric acid) formed during battery cycling. The presence of these acids may otherwise degrade the battery 10 and shorten the life of the battery 10. As such, it is believed that the adhesive attractiveness of the binder chosen for the negative electrode 12 advantageously increases the cycle life of the battery 10.

In one example, the binder may be chosen from polyethyleneimine (PEI), copolymers of polyethyleneimine, amine functionalized polyamides, proteins (e.g., soy proteins), gelatin, or combinations thereof. In another example, the binder may be chosen from polyethyleneimine, copolymers of polyethyleneimine, amine functionalized polyamides, proteins, or combinations thereof. In this latter example, the binder is not chosen from gelatin. The binder for the negative electrode 12 may be present in an amount ranging from about 1 wt % to about 15 wt % of the electrode 12 (excluding the current collector), and in some cases, in an amount ranging from about 5 wt % to about 15 wt % of the electrode 12 (excluding the current collector).

The binder may be in the form of solid particles or pellets.

The positive electrode 14 of the lithium ion battery 10 may, for example, be chosen from any positive electrode material that can reversibly accommodate lithium or lithium ions. In an example, the positive electrode 14 is chosen from layered oxides (such as $LiMO_2$, where M is chosen from a transition metal such as, e.g., Co, Ni, Mn, and combinations thereof), spinel oxides (such as $LiMn_2O_4$), phosphates (e.g., $LiMPO_4$, where M is chosen from a transition metal such as, e.g., Fe, Mn, Co, and combinations thereof), silicates (e.g., $Li_2MSiO_4$, where M is chosen from Co, Fe, Mn, and combinations thereof), and combinations thereof. Some specific examples of materials that may be chosen for the positive electrode 14 include $LiMn_2O_4$, $LiNiO_2$, $LiCoO_2$, and $LiMnO_2$.

It is to be understood that any known electrolyte 16 is contemplated as being within the purview of the instant disclosure. In an example, the electrolyte 16 may be chosen from a liquid electrolyte or a gel electrolyte. In a further example, the electrolyte 16 is a salt dissolved in an organic solvent or a mixture of organic solvents. Some non-limiting examples of salts include lithium hexafluorophosphate ($LiPF_6$), lithium tetrafluoroborate ($LiBF_4$), lithium perchlorate ($LiClO_4$), lithium hexaflurorarsenate ($LiAsF_6$), lithium trifluoroethanesulfonimide, and/or the like, and/or combinations thereof. Some non-limiting examples of solvents that may be used to dissolve the electrolyte salt include ethyl carbonate, dimethyl carbonate, methylethyl carbonate, propylene carbonate, and/or the like, and/or combinations thereof.

Also disclosed herein is a method of forming the negative electrode 12 for the lithium ion battery 10. An example of this method will be described in conjunction with FIGS. 2A through 2E. For purposes of simplifying the drawings, the components making up the negative electrode 12 are identified using numerical identifiers. For instance, the binder is identified by reference numeral 20, the active electrode material is identified by reference numeral 26, and the conductive additive is identified by reference numeral 28. Any solutions, dispersions, mixtures, and/or slurries formed throughout the process will also be individually identified by their own reference identifiers.

Furthermore, the binder chosen for the negative electrode 12 disclosed herein also advantageously simplifies the method of making the negative electrode 12. For instance, other binder materials such as, e.g., poly(vinylidene fluoride) (PVDF), typically require an organic solvent (such as, e.g., N-methyl-2-pyrrolidone (NMP)) to dissolve the polymer. In some instances, however, the presence of the organic solvent may deleteriously affect one or more method steps of the process of making the negative electrode 12. For instance, it may be difficult to remove the organic solvent from the negative electrode at least because of its high boiling point. Furthermore, it may be undesirable for the organic solvent to remain after processing is complete (e.g., due to environmental concerns, toxicity, etc.), and the organic solvent itself may be expensive.

Figures 2A, 2B, 2C:
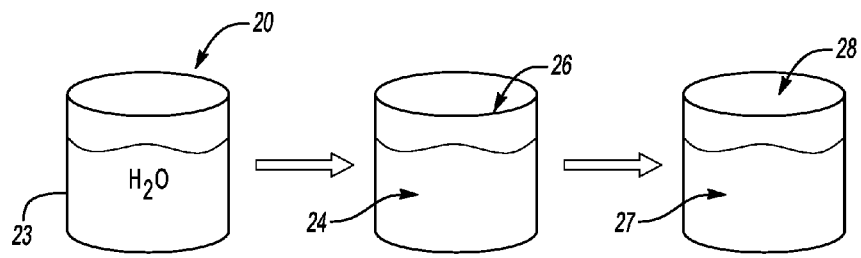
FIGS. 2A through 2E schematically illustrate an example of a method of making a negative electrode for a lithium ion battery.

An example of the method of making the negative electrode 12 will now be described herein. Referring to FIG. 2A, the method includes dissolving the binder 20 in water ($H_2O$) to form a binder solution 24. The dissolving may be accomplished, for example, by introducing the binder 20 into a container 23 that was previously filled with the water. It is to be understood that since the binder 20 is chosen from a water-soluble polymer, an organic solvent is not needed to dissolve the binder 20 in the water. In an example, the binder 20 was selected from one of the binder materials disclosed above, or was selected from a combination of two or more of the binder materials disclosed above.

In an example, the binder 20 is introduced into the water in the container 23 in an amount sufficient to create the binder solution 24 having a concentration of the binder ranging from about 0.1 wt % to about 20 wt %. The binder 20 may be introduced into the container 23, and the dissolving of the binder 20 in the water may be accomplished by mixing the two components together. Mixing may be accomplished, for example, via mechanical stirring alone, via sonication alone, or via sonication followed by mechanical stirring.

Referring now to FIG. 2B, the method further includes adding the active electrode material 26 into the binder solution 24, and then mixing them together to form a mixture 27. Mixing may be accomplished by mechanically stirring the mixture 27 (via, e.g., a mechanical stirring rod, a ball milling technique, or the like) for an amount of time sufficient to form a uniform dispersion of the active material 26 in the binder solution 24. During mechanical mixing, it is believed that the binder 20 attaches to the surfaces of the particles of the active electrode material 26 via strong non-covalent bonds. In an example, mixing is accomplished at a mixing speed of about 60 rpm to about 600 rpm. Further, if mixing is accomplished by mechanical stirring, the stirring of the mixture 27 may be accomplished for at least 10 minutes at or above 5° C. In one specific example, mechanical mixing is accomplished for at least 12 hours at or above 45° C. In another example, mixing may be accomplished by ultrasonicating the mixture 27 followed by stirring. This method also allows the binder 20 to attach (e.g., via covalent bonding) to the surfaces of the particles of the active electrode material 26. In this example, ultrasonication may be accomplished for at least 10 minutes at a temperature at or above 25° C., and then the mixture 27 may be stirred for at least 6 hours at the same temperature. In still another example, mixing may be accomplished via ultrasonication alone. This method also allows the binder 20 to attach (e.g., via covalent bonding) to the surfaces of the particles of the active electrode material 26. In this example, ultrasonication is performed for at least 10 minutes. It is to be understood that the mixing may be accomplished while the active material 26 is added to the binder solution 24. The mixing may otherwise be accomplished by adding the active material 26 to the binder solution 24, and then mixing the components together.

As shown in FIG. 2C, the method further involves introducing the conductive additive 28 to the mixture 27 inside the container 23, and then mixing the components together. Mixing may be accomplished using any of the methods previously described.

In another example, both of the active material 26 and the conductive additive 28 may be added to the container 23 and mixed together at the same time during the step depicted in FIG. 2B. In this example, the step shown in FIG. 2C is not needed.

Figures 2D, 2E:
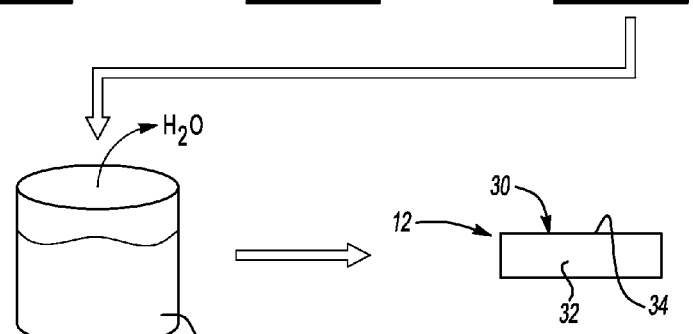

After the active material 26 and the conductive additive 28 have been mixed with the binder solution 24 (either independently as shown in FIGS. 2B and 2C, or simultaneously such as when both additions are accomplished during the step shown in FIG. 2B), at least a portion of the water is removed from the mixture to obtain a slurry 30 (shown in FIG. 2D). In an example, the amount of water that is removed is such that the slurry 30 has a viscosity ranging from about 100 cP to about 100,000 cP. In another example, the amount of water removed is such that the slurry 30 has a viscosity ranging from about 1000 cP to about 10,000 cP. The removal of the water may be accomplished, for instance, by allowing the mixture 27 to sit in the container 23 at room temperature (e.g., from about 20° C. to about 30° C.) for an amount of time sufficient for the water to evaporate. In some cases, it may be helpful to use some type of drying means to speed up the evaporation time, e.g., by exposing the mixture 27 to a high temperature (such as in an oven), using a vacuum, and/or the like. In an example, the mixture 27 may be exposed to a high temperature ranging from about 40° C. to about 90° C. In another example, the mixture 27 may be exposed to a high temperature ranging from about 50° C. to about 70° C.

The slurry 30 formed in the step shown in FIG. 2D may then be applied to a surface 34 of a current collector 32 to form a substantially uniform coating on the collector surface 34 (as shown in FIG. 2E). In an example, the slurry 30 is applied to the surface 34 via slot die coating, bar coating, doctor blading, and/or the like, and/or combinations thereof. This coating layer or film is not shown in FIG. 2E. The coating layer or film, when dried, may, in an example, have a thickness ranging from about 5 µm to about 500 µm. In another example, the coating layer has a thickness ranging from about 20 µm to about 60 µm. In yet another example, the coating layer or film has a thickness of about 20 µm. In still another example not shown in the drawings, the slurry 30 may be applied to both surfaces of the current collector 32 (i.e., surface 34 and the surface opposed thereto).

To further illustrate the present disclosure, examples are given herein. It is to be understood that these examples are provided for illustrative purposes and are not to be construed as limiting the scope of the disclosure.

EXAMPLES

Example 1

Figure 3:
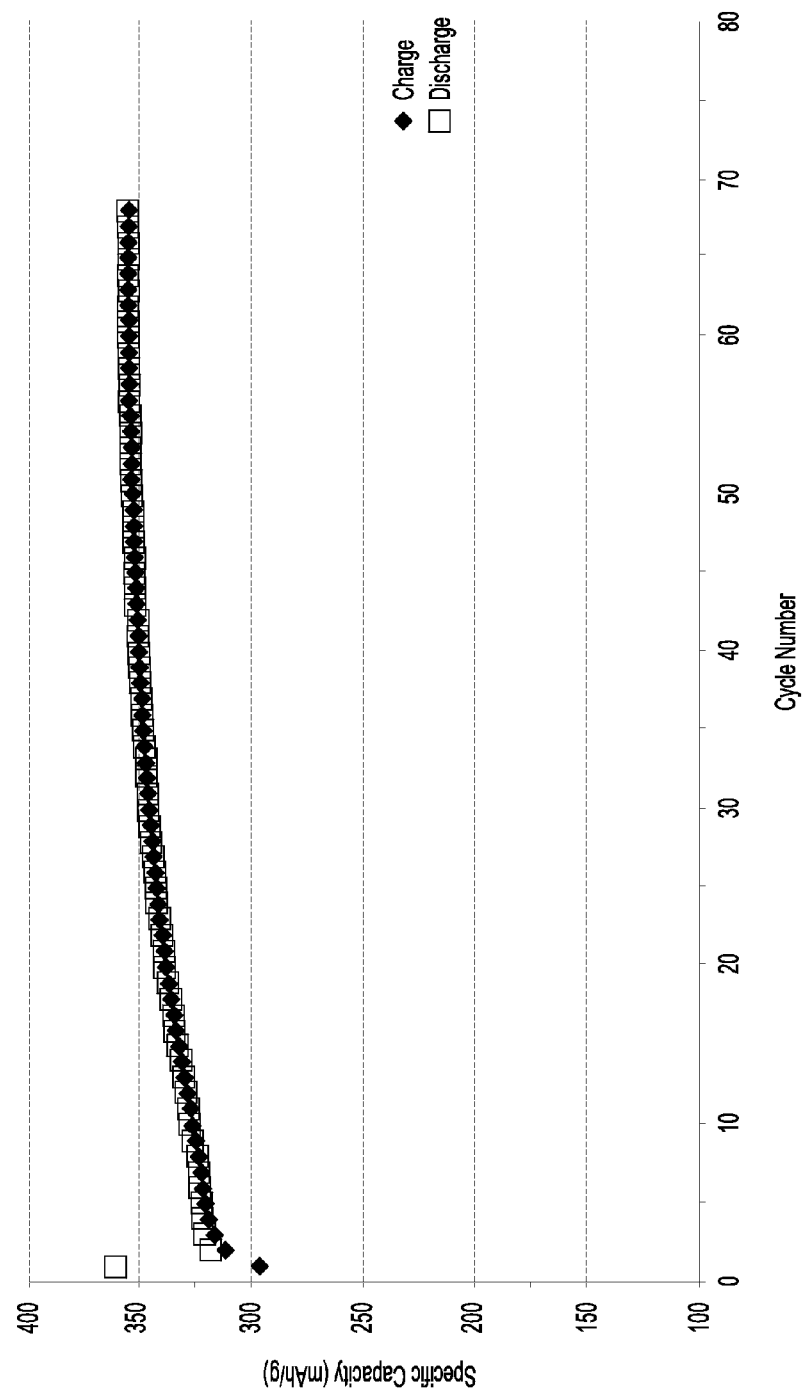
FIG. 3 is a graph showing the cycle performance of a negative electrode including a polyethyleneimine (PEI) binder.

A lithium ion battery was made using $LiMn_2O_4$ as the positive electrode, graphite including a polyethyleneimine (PEI) binder and carbon black (85:10:5) as the negative electrode, and a 1M solution of $LiPF_6$ in ethylene carbonate/diethyl carbonate (1:2 vol. %) as the electrolyte. The electrochemical performance of the battery was evaluated using a CR2325 coin cell (i.e., a button cell that is 23 mm in diameter and 2.5 mm in height) at C/5 rate operated between 2.0V and 0.0007 V vs. $Li/Li^+$ at a temperature of about 30° C. The cycle performance of the battery is shown in the graph depicted in FIG. 3, where the cycle number is plotted against the specific capacity (mAh/g) for both the charging and discharging states of the battery. FIG. 3 shows that the cycle performance in terms of the specific capacity, which deviated slightly from the cycle number 5 (specific capacity of about 320 mAh/g) to cycle number 70 (specific capacity of about 355 mAh/g) for both the charging and the discharging states.

Example 2

The peeling strength of a negative electrode material including a polyethyleneimine (PEI) binder and another negative electrode material including a poly(vinylidene fluoride) (PVDF) binder was tested and compared. Both of the negative electrode materials tested were applied to a current collector. Testing was accomplished by attaching a piece of SCOTCH® (3M) tape to the negative electrode materials, and measuring the force (via a tensile tester, such as one made by Instron (Norwood, Mass.)) that was required to detach the tape from the negative electrode material. In both tests, when the tape was detached from the current collector, the respective coatings were also removed from the respective current collectors. However, the results showed that the peeling strength of the negative electrode material including the PEI binder was stronger (which was measured to be 1.9 g/mm) than that of the negative electrode material including the PVDF binder (which was measured to be 1.0 g/mm).

It is to be understood that the ranges provided herein include the stated range and any value or sub-range within the stated range. For example, an amount ranging from about 1 wt % to about 10 wt % should be interpreted to include not only the explicitly recited limits of about 1 wt % to about 10 wt %, but also to include individual amounts, such as 2 wt %, 5 wt %, 7 wt %, etc., as well as sub-ranges. Furthermore, when "about" is utilized to describe a value, this is meant to encompass minor variations (up to +/−5%) from the stated value.

It is further to be understood that, as used herein, the singular forms of the articles "a," "an," and "the" include plural references unless the content clearly indicates otherwise.

While several embodiments have been described in detail, it will be apparent to those skilled in the art that the disclosed embodiments may be modified. Therefore, the foregoing description is to be considered non-limiting.

The invention claimed is:

1. A negative electrode for a lithium ion battery, comprising:
    an active electrode material selected from the group consisting of FeSn, $FeSn_2$, $Cu_6Sn_5$, Sn—Sb, $SnO_2$, and combinations thereof;
    a conductive additive; and a binder holding the active electrode material and the conductive additive together, the binder being a protein in a form of a solid particle or pellet;

wherein: the active electrode material is present in an amount ranging from about 80 wt % to about 98 wt % of the negative electrode; the conductive additive is present in an amount ranging from about 1 wt % to about 10 wt % of the negative electrode; and the binder is present in an amount ranging from about 5 wt % to about 15 wt % of the negative electrode.

2. The negative electrode as defined in claim 1 wherein the conductive additive is selected from the group consisting of carbon blacks and nickel powders.

3. The negative electrode as defined in claim 1 wherein the negative electrode includes 85 wt % of the active electrode material, 5 wt % of the conductive additive, and 10 wt % of the binder.

4. A lithium ion battery, comprising:
a positive electrode;
the negative electrode of claim 1; and
an electrolyte disposed between the positive electrode and the negative electrode.

5. The lithium ion battery as defined in claim 4 wherein the conductive additive is selected from the group consisting of carbon blacks and nickel powders.

6. The lithium ion battery as defined in claim 4 wherein the positive electrode is selected from the group consisting of lithium composite oxide, a polyanion, and combinations thereof.

7. The lithium ion battery as defined in claim 4 wherein the electrolyte is selected from the group consisting of lithium hexafluorophosphate, lithium tetrafluoroborate, lithium perchlorate, lithium hexafluoroarsenate, lithium bisperfluoroethanesulfonimide, and combinations thereof.

8. A method of forming a negative electrode for a lithium ion battery, the method comprising:

dissolving a binder in water to form a solution having a concentration ranging from about 5 wt % to about 15 wt % of the binder, the binder being a protein in a form of a solid particle or pellet;

mixing an active electrode material with the binder solution to form a mixture, the active electrode material being selected from the group consisting of FeSn, $FeSn_2$, $Cu_6Sn_5$, Sn—Sb, and $SnO_2$; and introducing a conductive additive to the mixture;

wherein the negative electrode consists of the binder, the active electrode material and the conductive additive, and wherein: the active electrode material is present in an amount ranging from about 80 wt % to about 98 wt % of the negative electrode; the conductive additive is present in an amount ranging from about 1 wt % to about 10 wt % of the negative electrode; and the binder is present in an amount ranging from about 5 wt % to about 15 wt % of the negative electrode.

9. The method as defined in claim 8 wherein prior to mixing the active electrode material with the binder solution, the method further comprises sonicating the solution at ambient temperature for a predetermined amount of time.

10. The method as defined in claim 8 wherein after the conductive additive is introduced, the method further comprises removing at least a portion of the water from the mixture to obtain a slurry having a viscosity ranging from about 100 cP to about 100,000 cP.

11. The method as defined in claim 10 wherein the electrode includes a current collector, and wherein the method further comprises applying the slurry onto a surface of the current collector to form a substantially uniform coating on the surface of the current collector.

12. The method as defined in claim 8 wherein the mixing is accomplished by i) stirring, or ii) ultrasonicating, or iii) ultrasonicating followed by stirring.

* * * * *